United States Patent
Keskar et al.

(10) Patent No.: US 11,928,600 B2
(45) Date of Patent: Mar. 12, 2024

(54) SEQUENCE-TO-SEQUENCE PREDICTION USING A NEURAL NETWORK MODEL

(71) Applicant: Salesforce, Inc., San Francisco, CA (US)

(72) Inventors: Nitish Shirish Keskar, San Bruno, CA (US); Karim Ahmed, Lebanon, NH (US); Richard Socher, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 1712 days.

(21) Appl. No.: 15/884,125

(22) Filed: Jan. 30, 2018

(65) Prior Publication Data

US 2019/0130273 A1    May 2, 2019

Related U.S. Application Data

(60) Provisional application No. 62/578,374, filed on Oct. 27, 2017.

(51) Int. Cl.
*G06N 3/084* (2023.01)
*G06F 40/47* (2020.01)
*G06F 40/58* (2020.01)

(52) U.S. Cl.
CPC ............. *G06N 3/084* (2013.01); *G06F 40/47* (2020.01); *G06F 40/58* (2020.01)

(58) Field of Classification Search
CPC .......... G06N 3/084; G06F 40/47; G06F 40/58
See application file for complete search history.

(56) References Cited

U.S. PATENT DOCUMENTS

| | | | |
|---|---|---|---|
| 8,121,367 | B2 | 2/2012 | Socher et al. |
| 8,355,550 | B2 | 1/2013 | Zhang et al. |
| 10,282,663 | B2 | 5/2019 | Socher et al. |
| 10,346,721 | B2 | 7/2019 | Albright et al. |

(Continued)

OTHER PUBLICATIONS

Convolutional sequence to sequence learning. International Conference on Machine Learning Jul. 1, 2017 (pp. 1243-1252). PMLR (Year: 2017).*

(Continued)

*Primary Examiner* — Li B. Zhen
*Assistant Examiner* — Moriam Mosunmola Godo
(74) *Attorney, Agent, or Firm* — Haynes and Boone LLP (57) ABSTRACT

A method for sequence-to-sequence prediction using a neural network model includes generating an encoded representation based on an input sequence using an encoder of the neural network model and predicting an output sequence based on the encoded representation using a decoder of the neural network model. The neural network model includes a plurality of model parameters learned according to a machine learning process. At least one of the encoder or the decoder includes a branched attention layer. Each branch of the branched attention layer includes an interdependent scaling node configured to scale an intermediate representation of the branch by a learned scaling parameter. The learned scaling parameter depends on one or more other learned scaling parameters of one or more other interdependent scaling nodes of one or more other branches of the branched attention layer.

20 Claims, 9 Drawing Sheets

(56) References Cited

U.S. PATENT DOCUMENTS

| | | | |
|---|---|---|---|
| 10,490,182 B1* | 11/2019 | Madhavaraj | G10L 15/063 |
| 10,552,968 B1* | 2/2020 | Wang | G06V 10/82 |
| 2016/0350653 A1 | 12/2016 | Socher et al. | |
| 2017/0024645 A1 | 1/2017 | Socher et al. | |
| 2017/0032280 A1 | 2/2017 | Socher et al. | |
| 2017/0140240 A1 | 5/2017 | Socher et al. | |
| 2018/0082171 A1 | 3/2018 | Merity et al. | |
| 2018/0096219 A1 | 4/2018 | Socher | |
| 2018/0096267 A1 | 4/2018 | Masekara et al. | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0124331 A1* | 5/2018 | Min | H04N 21/2181 |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0300400 A1 | 10/2018 | Paulus | |
| 2019/0108432 A1 | 4/2019 | Lu et al. | |
| 2019/0108439 A1 | 4/2019 | Lu et al. | |
| 2019/0130206 A1 | 5/2019 | Trott et al. | |
| 2019/0130248 A1 | 5/2019 | Zhong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |

OTHER PUBLICATIONS

Recurrent Neural Network Encoder with Attention for Community Question Answering, arXiv:1603.07044v1 [cs.CL] Mar. 23, 2016 (Year: 2016).*
Hori et al. ("Dialog state tracking with attention-based sequence-to-sequence learning." 2016 IEEE Spoken Language Technology Workshop (SLT). IEEE, 2016) (Year: 2016).*
Kaiser et al. ("One model to learn them all." arXiv preprint arXiv:1706.05137 (2017) (Year: 2017).*
Qian et al. ("Multi-scale Deep Learning Architectures for Person Re-identification" arXiv:1709.05165v1 [cs.CV] Sep. 15, 2017) (Year: 2017).*
Karim Ahmed and Lorenzo Torresani. BranchConnect: Large-Scale Visual Recognition with Learned Branch Connections. arXiv preprint arXiv: 1704.06010, 2017.
Jimmy Lei Ba, Jamie Ryan Kiros, and Geoffrey E Hinton. Layer normalization. arXiv preprint arXiv:1607.06450, 2016.
Dzmitry Bahdanau, Kyunghyun Cho, and Yoshua Bengio. Neural machine translation by jointly learning to align and translate. arXiv preprint arXiv:1409.0473. 2014.
Antonio Valerio Miceli Barone. Jindrich Helcl, Rico Sennrich, Barry Haddow, and Alexandra Birch. Deep architectures for neural machine translation. arXiv preprint arXiv:1707.07631,2017.
James Bradbury, Stephen Merity, Caiming Xiong, and Richard Socher. Quasi-recurrent neural networks. arXiv preprint arXiv:1611.01576,2016.
Kyunghyun Cho, Bart Van Merrienboer, Caglar Gulcehre, Dzminy Bahdanau, Fethi Bougares, Holger Schwenk, aod Yoshua Bengio. Learning phrase representations using RNN encoder-decoder for statistical machine translation. arXiv preprint arXiv: 1406.1078. 2014.
Xavier Gastaldi. Shake-Shake regularization. arXiv preprint arXiv: 1705.07485. 2017.
Jonas Gehring, Michael Auli, David Grangier, and Yann N. Dauphin. A convolutional encoder model for neural machine translation. arXiv preprint or arXiv: 1611.02344, 2016.
Jonas Gehring, Michael Aull. David Grangier. Denis Yarats. aod Yann N Dauphin. Convolutional Sequence to Sequence Learning. arXiv preprint arXiv:1705.03122, 2017.
Alex Graves, Abdel-rahman Mohamed, and Geoffrey Hinton. Speech recognition with deep recurrent neural networks. In Acoustics, speech and signal processing (icassp ). 2013 *ieee Interntational conference* on. pp. 6645-6649. IEEE. 2013.
Kaiming He, Xiangyu Zhang, Shaoqing Ren, and Jian Sun. Deep residual learning for image recognition. *In Proceedings of the IEEE conference on computer vision and pattern recognition*. pp. 770-778. 2016.
Sepp Hochreiter. The vanishing gradient problem during learning recurrent neural nets and problem solutions. *International Journal of Uncertainty, Fuzziness and Knowledge-Based Systems*, 6(02):107-116. 1998.
Sepp Hochreiter and Jurgen Schmidhuber. Long short-term memory. Neural computation, 9(8):1735-1780, 1997.
Sepp Hochreiter, Yoshua Bengio. Paolo Frasconi, Jurgen Schmidhuber, et al. Gradient flow in recurrent nets: the difficulty of learning long-term dependencies, 2001.
Hakan Inan, Khashayar .Khosravi, and Richard Sod1er. Tying Word Vectors and Word Classifiers: A Loss Framework for Language Modeling. arXiv preprint arXiv:1611.01462, 2016.
Lukasz Kaiser and Samy Bengio. Can active memory replace attention? In *Advances in Neural Information Processing Systems*, pp. 3781-3789. 2016.
Nal Kalchbrenner, Lasse Espeholt, Karen Simonyan, Aaron van den Oord, Alex Graves, and Koray Kavukcuoglu. Neural machine translation in linear time. arXiv preprint arXiv: 1610.10099, 2016.
Yoon Kim, Carl Denton, Luong Hoang, and Alexander M. Rush. Structured attention networks. arXiv preprint arXiv: 1702.00887, 2017.
Diederik Kingma and Jimmy Ba. Adam: A method for stochastic optimization. arXiv preprint arXiv: 1412.6980, 2014.
Tao Lei and Yu Zhang. Training RNNs as fast as CNNs. arXiv preprint arXiv: 1709.02755, 2017.
Zhouhan Lin, Minwel Feng, Cicero Nogueira dos Santos, Mo Yu, Bing Xiang, Bowen Zhou, and Yoshua Bengio. A structuted self-attentive sentence embedding. arXiv preprint arXiv: 1703.03130, 2017.
Minh-Thang Luong, Hieu Pham, and Christopher D. Manning. Effective approaches to attention-based neural machine translation. arXiv preprint arXiv:1508.04025. 2015.
Gabor Melis, Chris Dyer, and Phil Blunsom. On the state of the art of evaluation in neural language models. arXiv preprint arXiv: 1707.05589. 2017.
Stephen Merity, Nitish Shirish Keskar, and Richard Socher. Regularizing and optimizing LSTM language models. arXiv preprint arXiv:1708.02182, 2017.
Ankue P. Parikh, Oscar Tackstrom, Dipanjan Das, and Jakob Uszkoreit. A decomposable attention model for natural language inference. arXiv preprint arXiv:1606.01933. 2016.
Romain Paulus, Caiming Xiong, and Richard Socher. A deep reinforced model for abstractive summarization. arXiv preprint arXiv:1705.04304, 2017.
Ofir Press and Lior Wolf. Using the ouyput embedding to improve language models. arXiv preprint arXiv:1608.05859. 2016.
Rico Sennrich, Barry Haddow, and Alexandra Birch. Neural machine translation of rare words with subword units. arXiv preprint arXiv:1508.07909, 2015.
Noam Shazeer, Azalia Mirhoseini, Krzysztof Maziarz, Andy Davis, Quoc Le, Geoffrey Hinton, and Jeff Dean. Outrageously large neural networks: The sparsely-gated mixture-of-experts layer. arXiv preprint arXiv:1701.06538,2017.
Nitish Srivastava, Geoffrey E. Hinton. Alex Krizhevsky, Ilya Sutskever. and Ruslan Salakhutdinov. Dropout: a simple way to prevent neural network from overfitting. *Journal of machine learning research*. 15(1):1929-1958, 2014.
Hya Sutskever, Oriol Vinyals, and Quoc V. Le, Sequence to sequence learning with neural networks. *In Advances in neural information processing systems*, pp. 3104-3112, 2014.
Ashish Vaswani, Noam Shazeer, Niki Parmar. Jakob Uszkoreit. Llion Jones, Aidan N. Gomez, Lukasz Kaiser, and Illia Polosukhin. Attention is all you need. arXiv preprint arXiv :1706.03762. 20'17.
Yonghui Wu, Mike Schuster, Zhifeng Chen, Quoc V. Le, Mohammad Norouzi, Wolfgang Macherey, Maxim Krikun, Yuan Cao, Qin (56) References Cited

OTHER PUBLICATIONS

Gao, Klaus Macherey, et al. Google's neural machine translation system: Bridging the gap between human and machine translation. arXiv preprint arXiv:1609.08144. 2016.
Saining Xie, Ross Girshick, Piotr Dollar, Zhuowen Tu, and Kaiming He. Aggregated residual transformations for deep neural networks, arXiv preprint arXiv:1611.05431. 2016.
Wayne Xiong, Jasha Droppo, Xuednng Huang, Frank Seide, Mike Seltzer. Andreas Stolcke. Dong Yu, and Geoffrey Zweig. The Microsoft 2016 conversational speech recognition system. In Acoustics, Speech and Signal Processing (ICASSP), 2017 *IEEE International Conference* on, pp. 5255-5259. IEEE, 2017.
Jie Zhou, Ying Cao, Xuguang Wang, Peng Li, and Wei Xu. Deep recurrent models with fast-forward connections for neural machine translation. arXiv preprint arXiv:1606.04199, 2016.

\* cited by examiner

| Model | EN-DE BLEU | EN-FR BLEU |
|---|---|---|
| Transformer (small) | 27.3 | 38.1 |
| Weighted Transformer (small) | 28.4 | 38.9 |
| Transformer (large) | 28.4 | 41.0 |
| Weighted Transformer (large) | 28.9 | 41.4 |

| Model | Settings | | | | | BLEU | params |
|---|---|---|---|---|---|---|---|
| | $N$ | $d_{model}$ | $d_{ff}$ | $M$ | train steps | | $\times 10^6$ |
| Transformer | 2 | 512 | 2048 | 8 | 100K | 23.7 | 36 |
| Weighted Transformer | 2 | 512 | 2048 | 8 | 60K | 24.8 | 36 |
| Transformer | 4 | 512 | 2048 | 8 | 100K | 25.3 | 50 |
| Weighted Transformer | 4 | 512 | 2048 | 8 | 60K | 26.2 | 50 |
| Transformer | 6 | 512 | 2048 | 8 | 100K | 25.8 | 65 |
| Weighted Transformer | 6 | 512 | 2048 | 8 | 60K | 26.5 | 65 |
| Transformer | 8 | 512 | 2048 | 8 | 100K | 25.5 | 80 |
| Weighted Transformer | 8 | 512 | 2048 | 8 | 100K | 25.8 | 80 |
| Transformer | 6 | 1024 | 4096 | 16 | 300K | 26.4 | 213 |
| Weighted Transformer | 6 | 1024 | 4096 | 16 | 250K | 27.2 | 213 |

FIG. 8B

SEQUENCE-TO-SEQUENCE PREDICTION USING A NEURAL NETWORK MODEL

RELATED APPLICATIONS

The present application claims priority to U.S. Provisional Patent Application No. 62/578,374, filed Oct. 27, 2017, entitled "Weighted Transformer for Machine Translation," which is hereby incorporated by reference in its entirety.

TECHNICAL FIELD

Embodiments of the present disclosure relate generally to neural network models and more particularly to neural network models for sequence-to-sequence prediction.

BACKGROUND

Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications. Indeed, some applications have even been identified in which neural networking models exceed human-level performance.

BRIEF DESCRIPTION OF THE DRAWINGS

These and other aspects and features of the present disclosure will become apparent to those ordinarily skilled in the art upon review of the following description of specific embodiments in conjunction with the accompanying figures, wherein.

DETAILED DESCRIPTION

Sequence-to-sequence prediction is one class of problems to which neural networks may be applied. In sequence-to-sequence applications, a neural network model receives an input sequence and attempts to accurately predict an output sequence based on the input sequence. Sequence-to-sequence models have a wide variety of applications, including machine translation, text summarization, and/or the like. To illustrate, suppose an input sequence provided to a machine translation model includes the English text "Let's go for a walk." The ground truth German translation of the input sequence is "Lass uns spazieren gehen." Accordingly, the machine translation model should predict an output sequence that matches the ground truth translation.

The performance of sequence-to-sequence models, such as machine translation models, may be compared or benchmarked by testing different models on a shared dataset, such as, for example, the WMT 2014 English-to-German data set and/or the WMT 2014 English-to-French data set. The accuracy of each model may be measured by evaluating one or more metrics, such as the BLEU score accuracy. State of art machine translation models achieve a BLEU score of less than or equal 28.4 on the WMT 2014 English-to-German data set and 41.0 on the WMT 2014 English-to-French data set.

Accordingly, it is desirable to develop machine translation models that achieve higher accuracy than current state of art machine translation models. It is also desirable to develop techniques for training machine translation models faster and/or with less training data. More generally, it is desirable to develop improved neural network models for sequence-to-sequence prediction. Although some sequence-to-sequence prediction models receive text input sequences, such as the machine translation models described above, it is to be understood that the sequence-to-sequence models may operate on a wide variety of types of input sequences, including but not limited to text sequences, audio sequences, image sequences (e.g., video), and/or the like.

Figure 1:
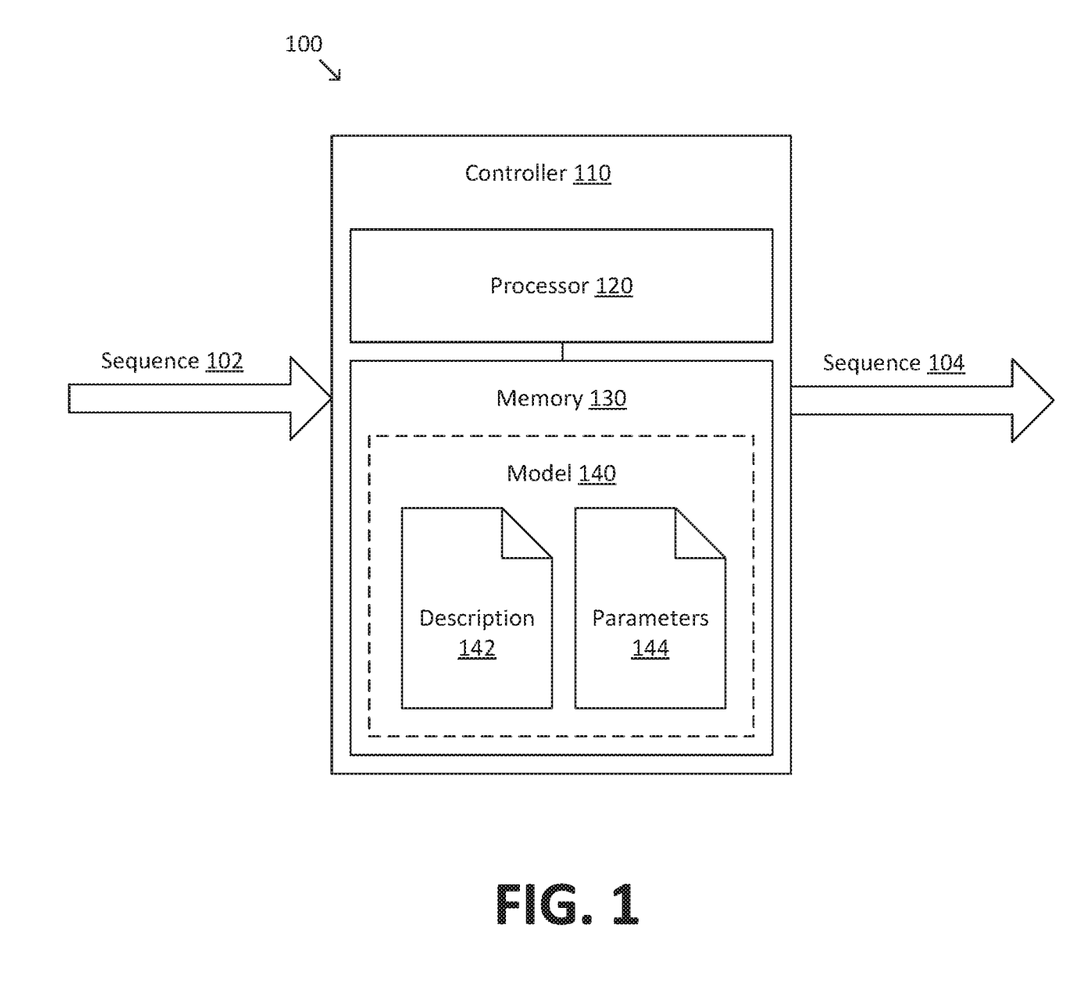
FIG. 1 is a simplified diagram of a system for sequence-to-sequence prediction according to some embodiments.

FIG. 1 is a simplified diagram of a system 100 for sequence-to-sequence prediction according to some embodiments. According to some embodiments, system 100 may receive an input sequence 102 and generate an output sequence 104. For example, in translation applications, input sequence 102 may correspond to a text sequence in a first language, and output sequence 104 may correspond to a text sequence in a second language. Similarly, in text summarization applications, input sequence 102 may correspond to a text sequence representing a document, and output sequence 104 may correspond to a text sequence representing a summary of the document. It is to be understood that these are merely examples, and that system 100 may be used in a wide variety of types of sequence-to-sequence prediction.

As depicted in FIG. 1, system 100 includes a controller 110. In some embodiments, controller 110 may include a processor 120 (e.g., one or more hardware processors). Although processor 120 may include one or more general purpose central processing units (CPUs), processor 120 may additionally or alternately include at least one processor that provides accelerated performance when evaluating neural network models. For example, processor 120 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, preprocessing, and/or the like) by an order of magnitude or more in comparison to a general purpose CPU.

Controller 110 may further include a memory 130 (e.g., one or more non-transitory memories). Memory 130 may include various types of short-term and/or long-term storage modules including cache memory, static random access memory (SRAM), dynamic random access memory (DRAM), non-volatile memory (NVM), flash memory, solid state drives (SSD), hard disk drives (HDD), optical storage media, magnetic tape, and/or the like. In some embodiments, memory 130 may store instructions that are executable by processor 120 to cause processor 120 to perform operations corresponding to processes disclosed herein and described in more detail below.

Processor 120 and/or memory 130 may be arranged in any suitable physical arrangement. In some embodiments, processor 120 and/or memory 130 may be implemented on a same board, in a same package (e.g., system-in-package), on a same chip (e.g., system-on-chip), and/or the like. In some embodiments, processor 120 and/or memory 130 may correspond to distributed, virtualized, and/or containerized computing resources. Consistent with such embodiments, processor 120 and/or memory 130 may be located in one or more data centers and/or cloud computing facilities.

In some embodiments, memory 130 may store a model 140 that is evaluated by processor 120 during sequence-to-sequence prediction. Model 140 may include a plurality of neural network layers. Examples of neural network layers include densely connected layers, convolutional layers, recurrent layers, pooling layers, dropout layers, and/or the like. In some embodiments, model 140 may include at least one hidden layer that is not directly connected to either an input or an output of the neural network. Model 140 may further include a plurality of model parameters (e.g., weights and/or biases) that are learned according to a machine learning process. Examples of machine learning processes include supervised learning, reinforcement learning, unsupervised learning, and/or the like Model 140 may be stored in memory 130 using any number of files and/or data structures. As depicted in FIG. 1, model 140 includes a model description file 142 that defines a computational graph of model 140 (e.g., a sequence of neural network layers) and a model parameters file 144 that stores parameters of model 140 (e.g., weights and/or biases). In general, model description file 142 and/or model parameters file 144 may store information associated with model 140 in any suitable format, including but not limited to structured, unstructured, serialized, and/or database formats.

Figure 2:
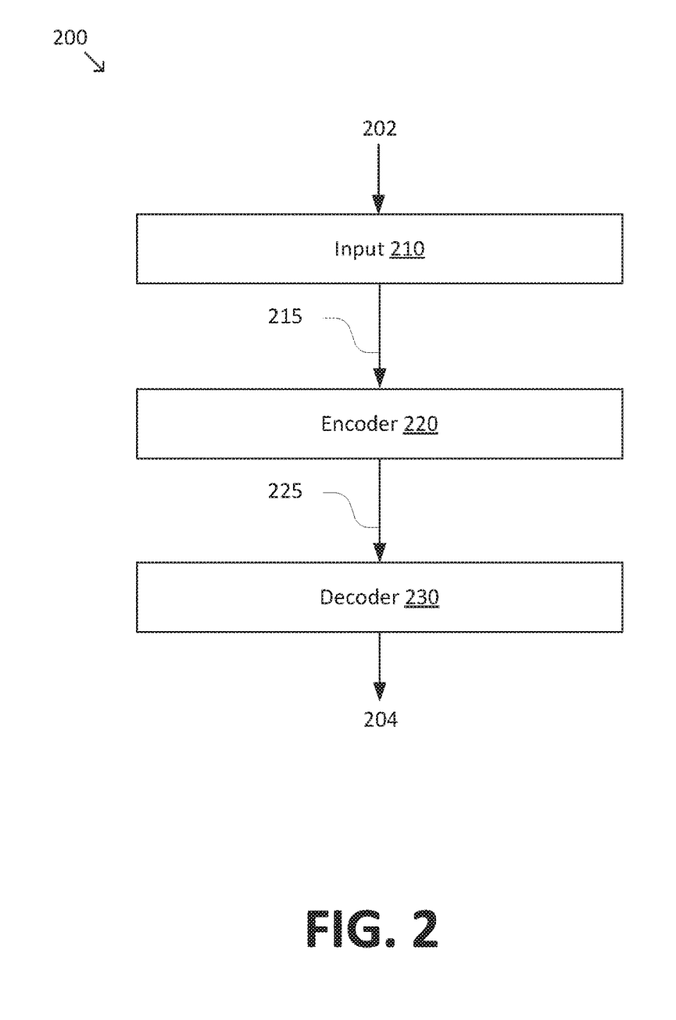
FIG. 2 is a simplified diagram of a model for sequence-to-sequence prediction according to some embodiments.

FIG. 2 is a simplified diagram of a model 200 for sequence-to-sequence prediction according to some embodiments. According to some embodiments consistent with FIG. 1, model 200 may be used to implement model 140. In some embodiments, model 200 may receive an input sequence 202 and predict an output sequence 204, which generally correspond to input sequence 102 and output sequence 104, respectively.

Model 200 may include an input stage 210 that receives input sequence 202 and generates an input representation 215 of input sequence 202. In some embodiments, input representation 215 may correspond to vector representations of input sequence 202. For example, when input sequence 202 corresponds to a text sequence, input stage 210 may generate the corresponding vector representation by (1) tokenizing the text sequence and (2) embedding the tokenized text sequence in a vector space. Tokenizing the text sequence may include identifying tokens within the text sequence, where examples of tokens include characters, character n-grams, words, word n-grams, lemmas, phrases (e.g., noun phrases), sentences, paragraphs, and/or the like. Embedding the tokenized text sequence may include mapping each token to a vector representation in a multidimensional vector space. For example, a token corresponding to a word may be mapped to a 300-dimensional vector representation of the word using the GloVe encodings.

In some embodiments, input stage 210 may perform positional encoding, such that input representation 215 includes positional information (e.g., information pertaining to the ordering of items in input sequence 202). For example, input stage 210 may perform additive encoding. In this regard, model 200 may retain sensitivity to the ordering of items in input sequence 202 without the use of recurrence (e.g., recurrent neural network layers) in model 200. The ability to limit and/or eliminate recurrence in model 200 may improve performance, e.g., by allowing for greater parallelization.

Model 200 may further include an encoder stage 220 that receives input representation 215 and generates an encoded representation 225 corresponding to input sequence 202. Model 200 may further include a decoder stage 230 that receives encoded representation 225 and predicts output sequence 204. In some embodiments, encoder stage 220 and/or decoder stage 230 may include one or more branched attention layers (e.g., branched attention encoder layers and/or branched attention decoder layers, as discussed below with reference to FIGS. 3A-3C).

According to some embodiments, model 200 may correspond to a computational graph, and input stage 210, encoder stage 220, and/or decoder stage 230 may correspond to collections of nodes in the computational graph. Consistent with such embodiments, various representations used by model 200, such as input representation 215, encoded representation 225, and/or any intermediate representations of input stage 210, encoder stage 220, and/or decoder stage 230, may correspond to real-valued tensors (e.g., scalars, vectors, multidimensional arrays, and/or the like). Moreover, each node of the computation graph may perform one or more tensor operations, e.g., transforming one or more input representations of the node into one or more output representations of the node. Examples of tensor operations performed at various nodes may include matrix multiplication, n-dimensional convolution, normalization, element-wise operations, and/or the like.

Figure 3A:
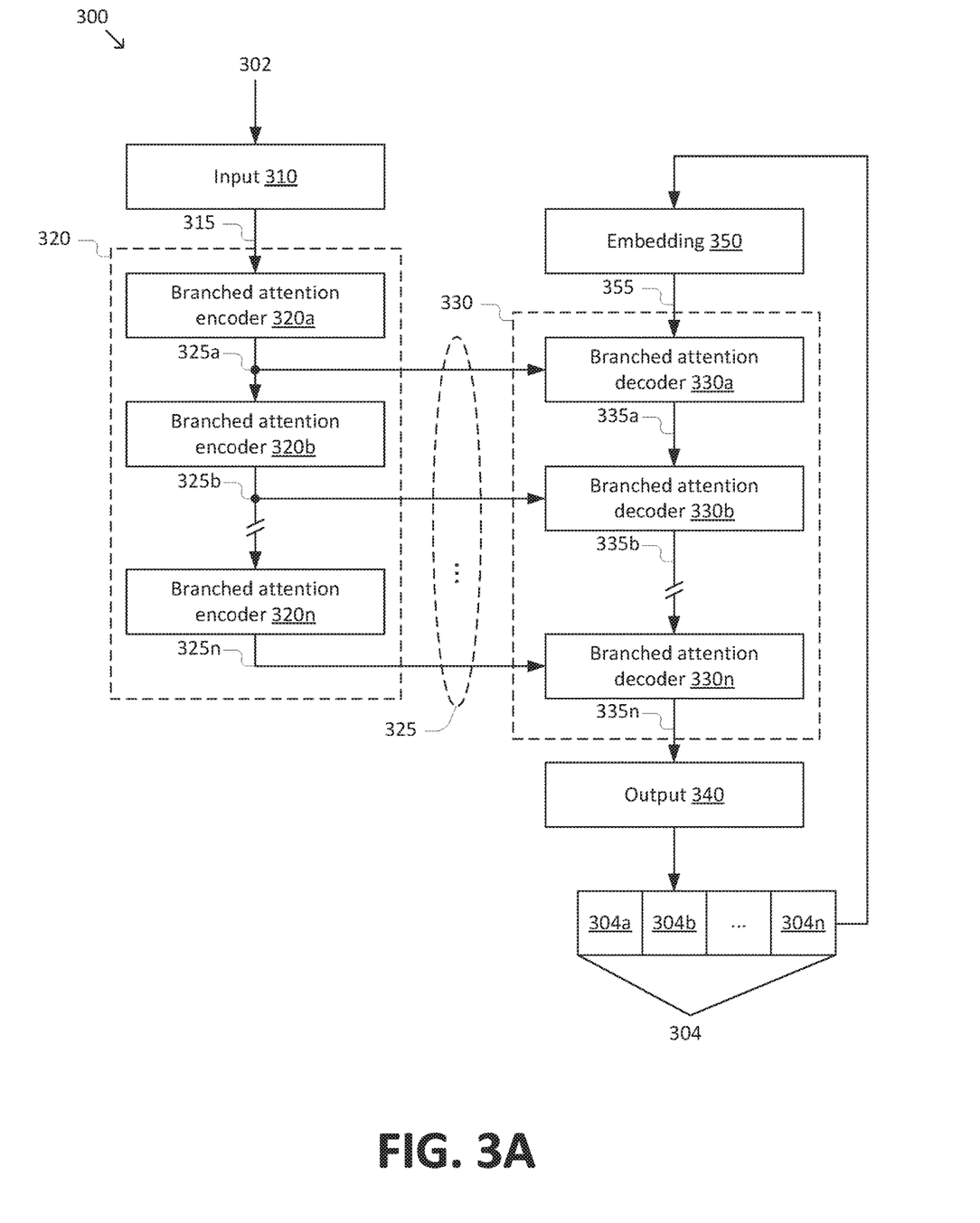
FIGS. 3A-3C are simplified diagrams of a branched transformer model according to some embodiments.
Figure 3B:
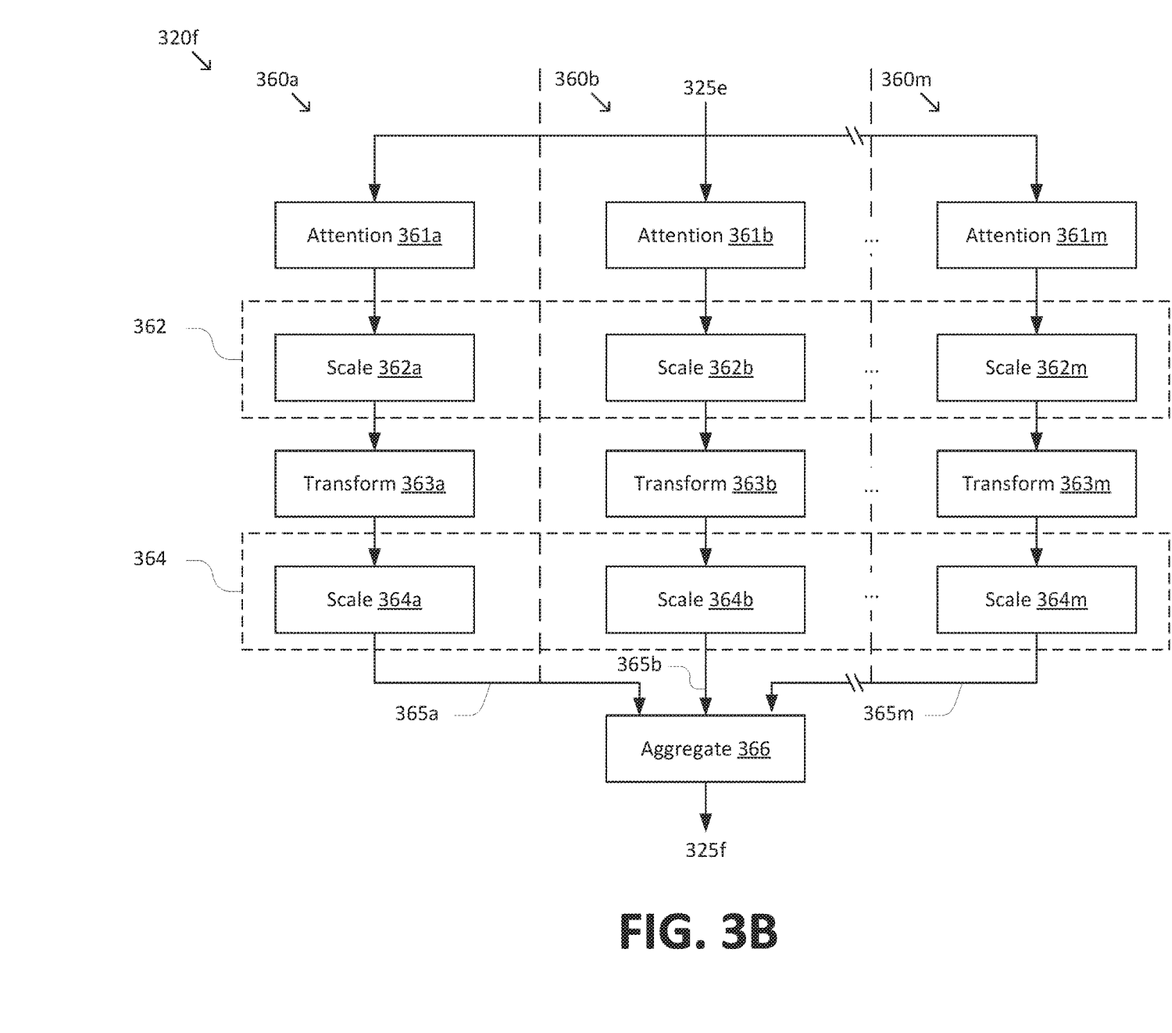
Figure 3C:
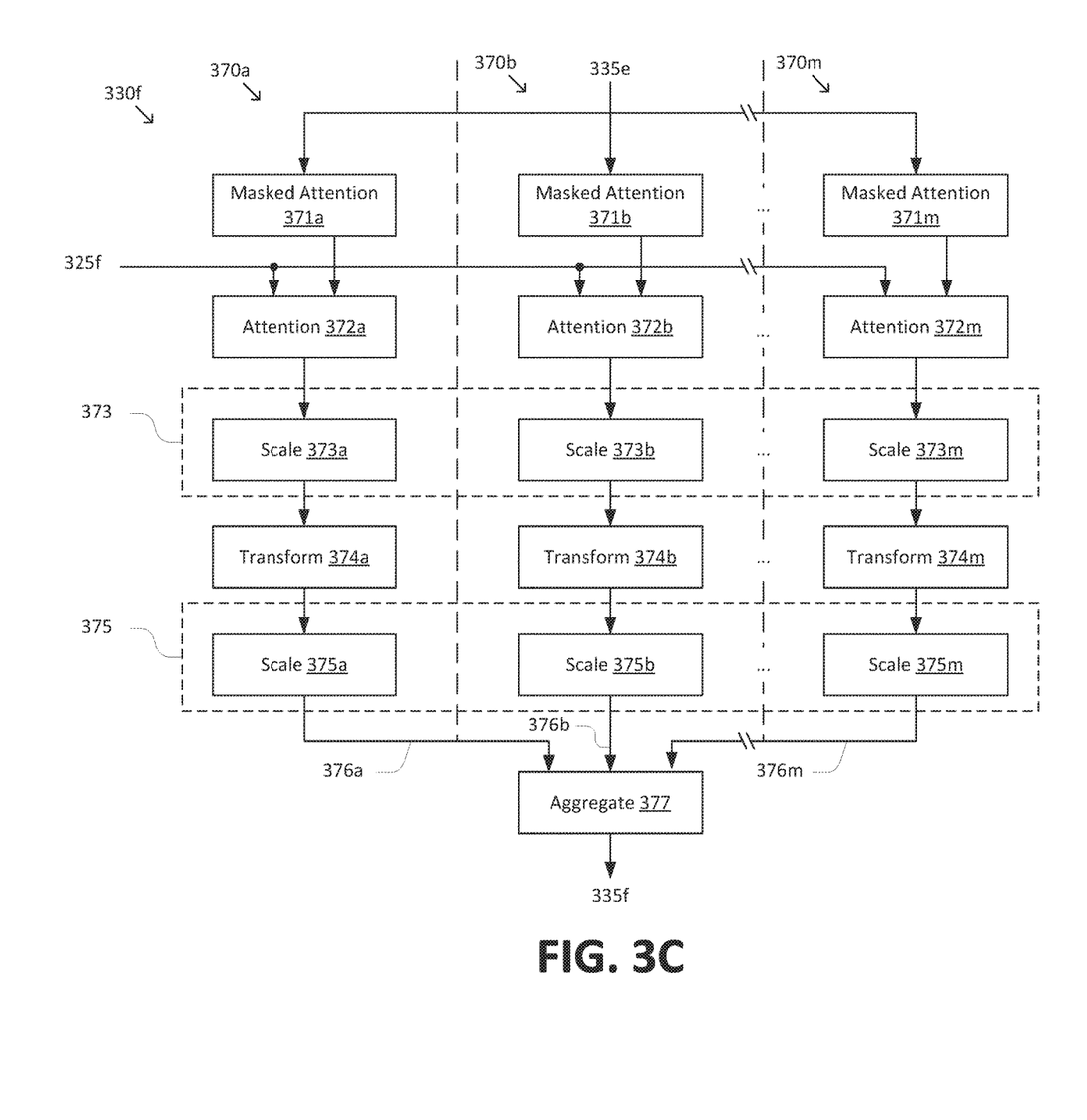

FIGS. 3A-3C are simplified diagrams of a branched transformer model 300 according to some embodiments. According to some embodiments consistent with FIGS. 1-2, branched transformer model 300 may be used to implement model 140 and/or 200. Consistent with such embodiments, branched transformer model 300 may receive an input sequence 302 and generate an output sequence 304, which generally correspond to input sequences 102 and/or 202 and output sequences 104 and/or 204, respectively. In some embodiments, branched transformer model 300 may include at least some features that are similar to the transformer model described in "Attention is All You Need," to Vaswani et. al., *arXiv preprint arXiv:*1706.03762, submitted Jun. 12, 2017, which is hereby incorporated by reference in its entirety.

As depicted in FIG. 3A, branched transformer model 300 includes an input stage 310, and encoder stage, 320, and a decoder stage 330, which generally correspond to similarly labeled features of FIG. 2. Encoder stage 320 includes one or more branched attention encoder layers 320*a-n* arranged sequentially (e.g., in a pipelined manner). Likewise, decoder stage 330 includes a corresponding set of one or more branched attention decoder layers 330*a-n*, also arranged sequentially. Each of branched attention encoder layers 320a-n generates a respective layer encoded representation 325a-n that is received by a corresponding decoder layer among branched attention decoder layers 330a-n. Collectively, layer encoded representations 325a-n form an encoded representation 325, which generally corresponds to encoded representation 225.

The first encoder layer among branched attention encoder layers 320a-n receives an input representation 315 from input stage 310, which generally corresponds to input representation 215. Each subsequent layer among branched attention encoder layers 320a-n receives the layer encoded representations 325a-(n-1) generated by a preceding layer among branched attention encoder layers 320a-(n-1). Similarly, each of branched attention decoder layers 330a-(n-1) generates a respective layer decoded representation 335a-(n-1) that is received by a subsequent layer among decoder layers 330b-n. An output layer 340 receives decoded representation 335n from the decoder layer 330n and generates output sequence 304.

In general, output sequence 304 includes a plurality of items 304a-n. As depicted in FIG. 3A, output layer 340 predicts output sequence 304 iteratively, e.g., one item at a time. After each iteration, output sequence 304 is fed back through decoder stage 330 to predict the next item in output sequence 304 until the iterative process terminates. For example, the iterative process may terminate when output sequence 304 reaches a predetermined maximum length and/or when the predicted item during a given iteration corresponds to a special tag marking the end of output sequence 304 (e.g., an end-of-sentence tag). During the first iteration, a placeholder item and/or sequence (e.g., a beginning-of-sentence tag) may be provided.

In some embodiments, branched transformer model 300 may include an embedding layer 350 that generates an output representation 355 based on output sequence 304. In general, embedding layer 350 may perform similar embedding operations based on output sequence 304 to those that input stage 310 performs based on input sequence 302. For example, when output sequence 304 includes a sequence of text, embedding layer 350 may map each word (and/or other suitable token) into a word vector space. Likewise, embedding layer 350 may perform positional encoding. Output representation 355 is then received by the first branched attention decoder layer 330a.

FIG. 3B depicts a branched attention encoder layer 320f, which may be used to implement one or more of branched attention encoder layers 320a-n. Branched attention encoder layer 320f receives a layer input representation 325e and generates a layer encoded representation 325f. Layer input representation 325e may correspond to a layer encoded representation from a previous encoder layer, or when branched attention encoder layer 320f corresponds to the first branched attention encoder layer in a sequence (e.g., branched attention encoder layer 320a), to an input representation. As depicted in FIG. 3B, branched attention encoder layer 320f includes a plurality of branches 360a-m arranged in parallel. Each of branches 360a-m receives a copy of layer encoded representation 325e and generates a respective branch output representation (e.g., branch output representations 365a-m). An aggregation node 366 aggregates branch output representations 365a-m to form layer encoded representation 325f. In some embodiments, aggregation node 366 may aggregate branch output representations 365a-m by concatenation, summation, and/or the like.

According to some embodiments, each of branches 360a-m may include one or more sub-layers arranged sequentially. As depicted in FIG. 3B, the sub-layers may include, but are not limited to, a parameterized attention network (e.g., parameterized attention networks 361a-m), a parameterized transformation network (e.g., parameterized transformation networks 363a-m), and/or the like. In some embodiments, parameterized attention networks 361a-m may each perform one or more parameterized transformation operations and/or one or more attention operations based on layer input representation 325e. Illustrative embodiments of an attention network, which may be used to implement parameterized attention networks 362a-m, are described in further detail below with reference to FIG. 4.

In some embodiments, parameterized transformation networks 363a-m may each perform one or more parameterized transformation operations. Examples of the parameterized transformation operations include multiplying, by matrix multiplication, a representation by a projection matrix containing trainable weights, adding trainable biases to the representation, and/or the like. In some examples, parameterized transformation networks 363a-m may perform various other operations, such as evaluating an activation function. In illustrative embodiments, one or more of parameterized transformation networks 363a-m may correspond to a two-layer feed-forward neural network evaluated according to the following equation:

$$FFN_i(x_i) = \text{activation}_i(x_i W_i^1 + b_i^1) W_i^2 + b_i^2 \quad (1)$$

where $x_i$ denotes the input to the feed-forward network corresponding to the ith branch; $W_i^1$ and $W_i^2$ denote projection matrices containing trainable weights; $b_i^1$ and $b_i^2$ denote trainable biases; and activation denotes an activation function (e.g., linear, rectified linear unit (ReLU), tanh, sigmoid, and/or the like).

Various problems and/or inefficiencies may arise during training and/or prediction if each of branches 360a-m are given the same priority or emphasis when aggregated by aggregation node 366. For example, branches 360a-m may co-adapt. That is, various branches among branches 360a-m may adapt to recognize the same or similar features based on layer input representation 325e, resulting in an inefficient duplication of functionality, loss of generality, and/or the like.

To address these challenges, each of branches 360a-m may include one or more scaling nodes (e.g., scaling nodes 362a-m and/or 364a-m). Scaling nodes 362a-m and/or 364a-m multiply, by scalar multiplication, various intermediate representations of branches 360a-m (e.g., output representations of parameterized attention networks 361a-m and/or parameterized transformation networks 366a-m) by learned scaling parameters. Like other model parameters of branched transformer model 300, the learned scaling parameters may be trainable and/or may be learned according to a machine learning process.

In some embodiments, scaling nodes 362a-m and/or 364a-m may be arranged as sets of interdependent scaling nodes 362 and/or 364 that are correlated across branches 360a-m. That is, the learned scaling parameters associated with interdependent scaling nodes 362a-m and/or 364a-m may be dependent on one another. For example, the learned scaling parameters may be subject to a joint constraint (e.g., they may add up to a predetermined value). In illustrative embodiments, the learned scaling parameters may correspond to weighting parameters that have values between zero and one and add up to one.

According to some embodiments, the use of the learned scaling parameters may reduce and/or prevent co-adaptation among branches 360a-m during training, thereby improving the performance of branched transformer model 300. Moreover, the number of learned scaling parameters in branched attention encoder layer 320f is $\mathcal{O}(M)$, where M denotes the number of branches 360a-m. This may represent a small subset of the total number of learnable model parameters associated with branched attention encoder layer 320f (e.g., the total number of weights and/or biases associated with parameterized attention layers 361a-m and/or parameterized transformation layers 363a-m). Consequently, the use of scaling nodes 362a-m and/or 364a-m may substantially improve performance without substantially increasing the complexity of branched transformer model 300.

FIG. 3C depicts a branched attention decoder layer 330f, which may be used to implement one or more of branched attention decoder layers 330a-n. Like branched attention encoder layer 320f, branched attention decoder layer 330f may include scaling nodes (e.g., scaling nodes 373a-m and/or 375a-m) that operate in a manner similar to scaling nodes 362a-m and/or 364a-m of branched attention encoder layer 320f. Accordingly, branched attention decoder layer 330f may similarly prevent and/or reduce co-adaptation among a plurality of branches 370a-m.

Like scaling nodes 362a-m and/or 364a-m, scaling nodes 373a-m and/or 375a-m may be arranged as sets of interdependent scaling nodes 373 and/or 375 that are correlated across branches 370a-m. For example, the learned scaling parameters may be subject to a joint constraint (e.g., they may add up to a fixed value). In illustrative embodiments, the learned scaling parameters may correspond to weighting parameters that have values between zero and one and add up to one.

Branched attention decoder layer 330f receives a layer input representation 335e and a layer encoded representation 325f from a corresponding encoder layer and generates a layer decoded representation 335f. Layer input representation 335e may correspond to a layer decoder representation from a previous decoder layer or, when branched attention decoder layer 330f corresponds to the first branched attention decoder layer in a sequence (e.g., branched attention decoder layer 330a), to an output representation, such as output representation 355. As depicted in FIG. 3C, branched attention decoder layer 330f includes a plurality of branches 370a-m. Each of branches 370a-m receives a copy of layer input representation 335e and layer encoded representation 325f and generates a respective branch output representation 376a-m (e.g., branch output representations 376a-m). An aggregation node 377 aggregates branch output representations 376a-m to form layer decoded representation 335f. In some embodiments, aggregation node 377 may aggregate branch output representations 375a-m by concatenation, summation, and/or the like.

According to some embodiments, each of branches 370a-m may include one or more sub-layers arranged sequentially. As depicted in FIG. 3C, the sub-layers may include, but are limited to, a masked attention network (e.g., masked attention networks 371a-m), a parameterized attention network (e.g., parameterized attention networks 372a-m), a parameterized transformation network (e.g., parameterized transformation networks 374a-m), and/or the like. These generally correspond to similarly labeled features of FIG. 3B. Illustrative embodiments of an attention network, which may be used to implement masked attention networks 371a-m and/or parameterized attention networks 372a-m, are described in further detail below with reference to FIG. 4.

Although not depicted in FIGS. 3A-3C, branched transformer model 300 may include any number of residual connections that bypass one or more layers and/or sub-layers of branched transformer model 300. In general, the use of residual connections may accelerate the training of branched transformer model 300 by reducing the effective path length between a given layer and/or sub-layer and output layer 340. For example, the use of residual connections may address problems associated with gradient degradation (e.g., vanishing and/or exploding gradients) as the depth of branched transformer model 300 (e.g., the number of branched attention encoder and/or decoder layers 320a-n and/or 330a-n) increases. Consistent with such embodiments, branched transformer model 300 may include one or more merge nodes (not shown) that merge residual connections with non-residual connections (e.g., sequential connections that do not bypass layers and/or sublayers). For example, the merge nodes may perform concatenation, addition, and/or normalization operations based on representations received via the residual and non-residual connections.

Figure 4:
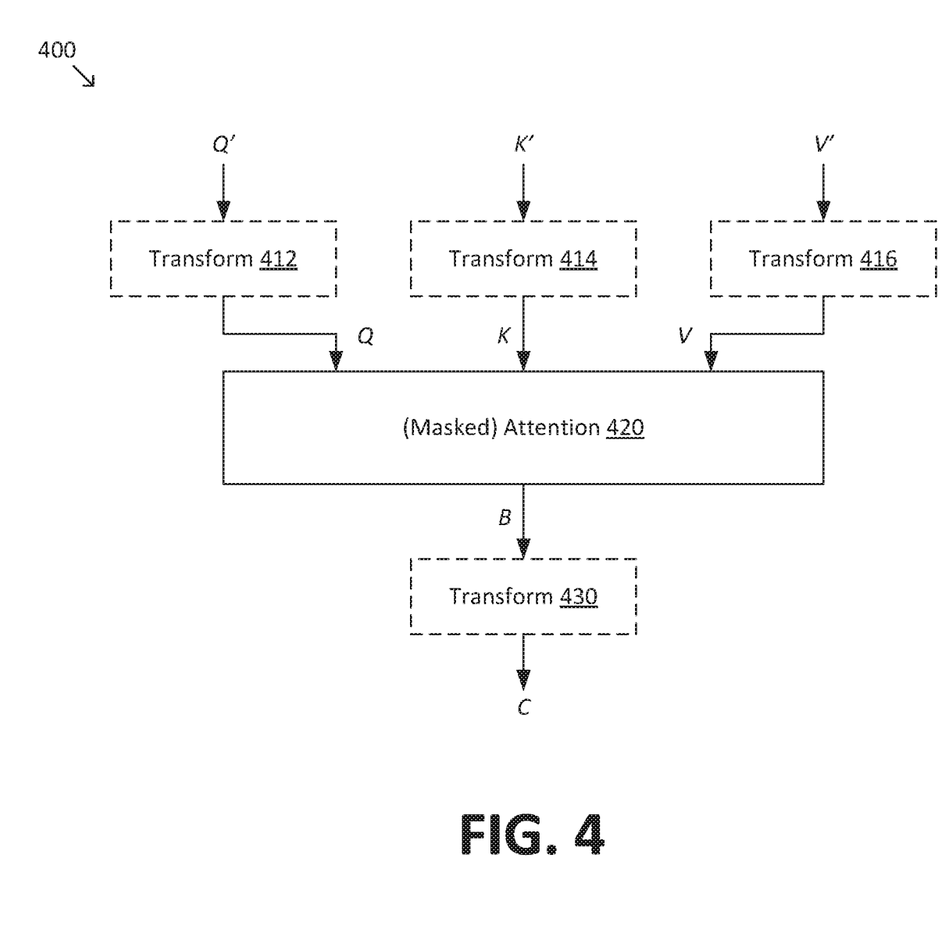
FIG. 4 is a simplified diagram of an attention network according to some embodiments.

FIG. 4 is a simplified diagram of an attention network 400 according to some embodiments. In some embodiments, attention network 400 may receive a query representation Q', a key representation K', and a value representation V'. In some embodiments, one or more of representations Q', K', and/or V' may correspond to copies of each other, such that one or more pairs of representations Q', K', and/or V' may be the same, and/or all three of representations Q', K', and/or V' may be the same. For example, when attention network 400 is used to implement parameterized attention networks 362a-m, as depicted in FIG. 3B, each of representations Q', K', and V' may correspond to a copy of the layer input representation (e.g., layer encoded representation 325e). Similarly, when attention network 400 is used to implement masked attention networks 371a-m, as depicted in FIG. 3C, each of representations Q', K', and V' may correspond to a copy of the layer input representation (e.g., layer decoded representation 335e). Meanwhile, when attention network 400 is used to implement parameterized attention networks 372a-m, as depicted in FIG. 3C, query representations Q' and key representation K' may correspond to output representations generated by masked attention networks 371a-m, and value representation V' may correspond to layer encoded representation 325f.

In some embodiments, attention network 400 may be configured as a parameterized attention network (e.g., when used to implement parameterized attention networks 361a-m and/or 372a-m). Accordingly, attention network 400 may include one or more parameterized transformation networks 412, 414, and/or 416 that receive representations Q', K', and V', respectively, and generate a transformed query representation Q, a transformed key representation K, and a transformed value representation V, respectively. In some embodiments, parameterized transformation networks 412, 414, and/or 416 may perform a variety of parameterized transformation operations, analogous to parameterized transformation networks 363a-m and/or 374a-m. In illustrative embodiments, parameterized transformation networks 412, 14, and/or 416 may perform linear transformations according to the following equations:

$$Q = Q'W^Q \in \mathbb{R}^{d_q}$$

$$K = K'W^K \in \mathbb{R}^{d_k}$$

$$V = V'W^V \in \mathbb{R}^{d_v}$$

where $W^Q \in \mathbb{R}^{d_{model} \times d_q}$, $W^K \in \mathbb{R}^{d_{model} \times d_k}$, and $W^V \in \mathbb{R}^{d_{model} \times d_v}$ denote projection matrices containing trainable weights;

$d_{model}$ represents the number of dimensions of Q', K', and V'; and $d_q$, $d_k$, and $d_v$ represent the number of dimensions of Q, K, and V, respectively.

In some embodiments, attention network 400 may include an attention node 420 that performs an attention operation (e.g., dot-product self-attention, scaled dot-product self-attention, and/or the like) based on representations Q, K, and V and outputs an intermediate representation B. In illustrative embodiments, attention node 420 may evaluate B according to the following equation for determining scaled dot-product attention:

$$B = \text{Attention}(Q, K, V) = \text{softmax}\left(\frac{QK^T}{\sqrt{d_k}}\right)V \in \mathbb{R}^{d_v}$$

where softmax(X) denotes the softmax operation over the matrix X and $X^T$ denotes the transpose of the matrix representation X.

In some embodiments, attention network 400 may be configured as a masked attention network (e.g., when used to implement masked attention networks 371a-m). Accordingly, attention node 420 may evaluate B according to the following equation for determining masked scaled dot-product attention:

$$B = \text{MaskedAttention}(Q, K, V) = \text{softmax}\left(\frac{MQK^T}{\sqrt{d_k}}\right)V \in \mathbb{R}^{d_v}$$

where M denotes the mask. For example, the when decoder stage 330 iteratively generates output sequence 304, the mask M may be updated at each iteration to mask portions of output sequence 304 that have not yet been predicted.

In some embodiments, attention network 400 may further include a parameterized transformation network 430 that receives intermediate representation B and generates an attended representation C. In general, parameterized transformation network 430 may be similar to parameterized transformation networks 412-416. In illustrative embodiments, parameterized transformation network 430 may evaluate C according to the following expression:

$$C = BW^O \in \mathbb{R}^{d_{model}}$$

where $W^O \in \mathbb{R}^{d_v \times d_{model}}$ denotes a projection matrix containing trainable weights.

Figure 5:
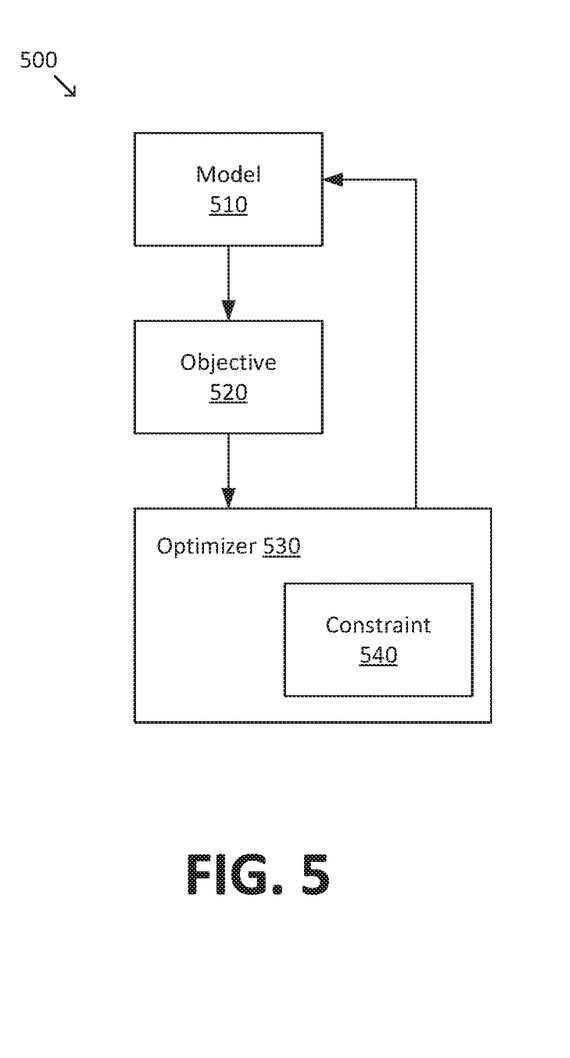
FIG. 5 is a simplified diagram of a training configuration for a neural network model according to some embodiments.

FIG. 5 is a simplified diagram of a training configuration 500 for a neural network model according to some embodiments. As depicted in FIG. 5, training configuration 500 is used to train a model 510. In some embodiments consistent with FIGS. 1-4, model 510 may be used to implement model 200 and/or branched transformer model 300. In some embodiments, model 510 may include one or more branched attention layers, such as branched attention encoder layers 320a-n and/or branched attention decoder layers 330a-n.

According to some embodiments, training configuration 500 may be used to train a plurality of model parameters of model 510. During training, a large number of training examples (e.g., training input sequences) are provided to model 510. The output items and/or sequences predicted by model 510 are compared to a ground truth sequence for each of the training examples using a learning objective 520, which determines a loss and/or reward associated with a given prediction based on the ground truth sequence. In some embodiments, learning objective 520 may include a supervised learning objective, a reinforcement learning objective, and/or the like.

The output of learning objective 520 (e.g., the loss and/or reward) is provided to an optimizer 530 to update the model parameters of model 510. For example, optimizer 530 may determine a gradient of the objective with respect to the model parameters and adjust the model parameters using back propagation. In some embodiments, optimizer 530 may include a gradient descent optimizer (e.g., stochastic gradient descent (SGD) optimizer), an ADAM optimizer, an Adagrad optimizer, an RMSprop optimizer, and/or the like. Various parameters may be supplied to optimizer 530 (e.g., a learning rate, a decay parameter, and/or the like) depending on the type of optimizer used.

According to some embodiments, one or more model parameters may be interdependent and/or subject to one or more constraints. For example, as depicted in FIG. 3A-3C, branched transformer model 300 may include one or more sets of interdependent scaling nodes, such as interdependent scaling nodes 362, 364, 373, and/or 375. In a given set of interdependent scaling nodes, the learned scaling parameters are interdependent and/or subject to a joint constraint. For example, the learned scaling parameters may correspond to weighting parameters that are between zero and one and may add up to one. Accordingly, optimizer 530 may include a constraint enforcement module 540 that enforces various constraints and/or interdependencies of the model parameters. For example, constraint enforcement module 540 may project the model parameters (e.g., the learned scaling parameters) onto a constraint set during and/or after each optimization step.

Figure 6:
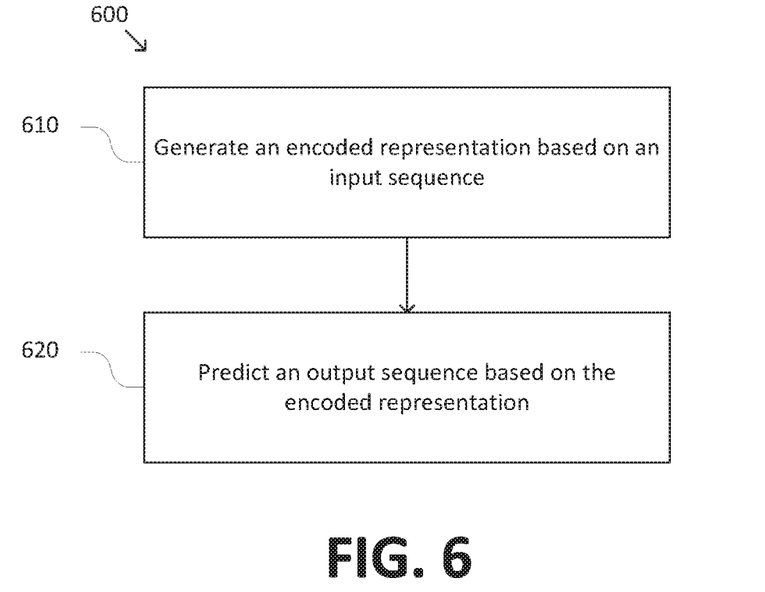
FIG. 6 is a simplified diagram of a method for sequence-to-sequence prediction according to some embodiments.

FIG. 6 is a simplified diagram of a method 600 for sequence-to-sequence prediction according to some embodiments. According to some embodiments consistent with FIGS. 1-5, method 600 may be performed using a processor, such as processor 120. In some embodiments, method 600 may be performed by evaluating a neural network model, such as model 140, model 200, and/or branched transformer model 300. In some embodiments, the neural network model may include a plurality of model parameters learned according to a machine learning process.

At a process 610, an encoded representation is generated based on an input sequence. In some embodiments, the encoded representation may be generated by an encoder stage of the neural network model, such as encoder stage 220. In illustrative embodiments, the encoder stage may include one or more branched attention encoder layers, such as branched attention encoder layers 320a-n, arranged sequentially. In some embodiments the first and second sequence may correspond to text sequences, audio sequences, image sequences (e.g., video), and/or the like. In machine translation applications, the first sequence may correspond to a text sequence (e.g., a word, phrase, sentence, document, and/or the like) in a first language.

At a process 620, an output sequence is predicted based on the encoded representation. In some embodiments, the output sequence may be predicted using a decoder stage of the model, such as decoder stage 230. In some embodiments, the decoder model may iteratively generate the output sequence, e.g., one item at a time. In illustrative embodiments, the decoder stage may include one or more branched attention decoder layers, such as branched attention decoder layers 330a-n, arranged sequentially. In machine translation applications, the output sequence may correspond to a translated version of the first sequence in a second language.

Figure 7:
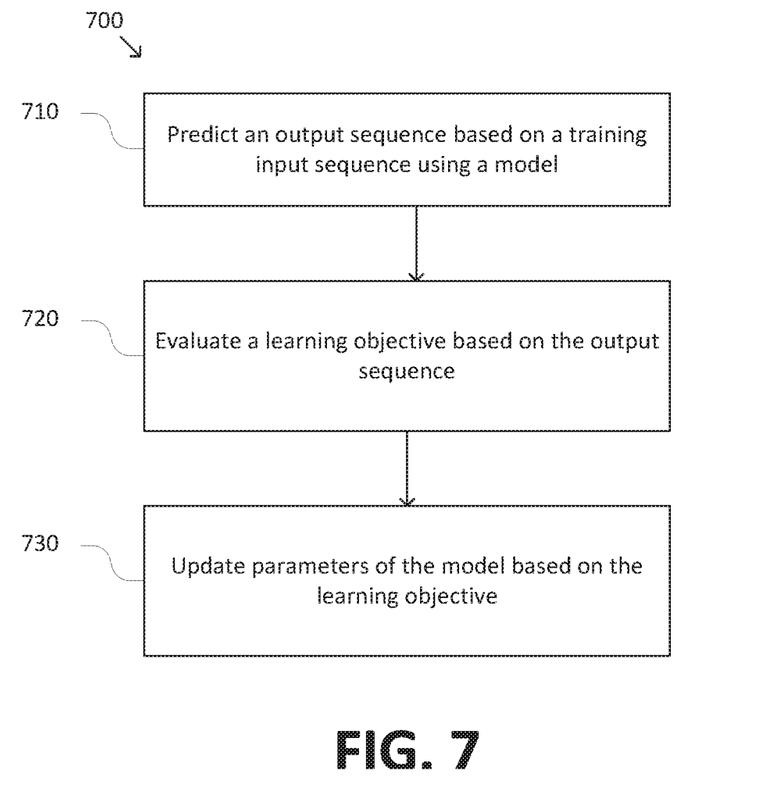
FIG. 7 is a simplified diagram of a method for training a neural network model according to some embodiments.

FIG. 7 is a simplified diagram of a method 700 for training a neural network model according to some embodiments. According to some embodiments consistent with FIGS. 1-6, method 700 may be used to train a neural network model, such as model 140, model 200, and/or branched transformer model 300. During training, the model may be configured in a training configuration, such as training configuration 500. In some examples, method 700 may be performed iteratively over a large number of training examples to gradually train the neural network model.

At a process 710, an output sequence is predicted based on a training input sequence using the neural network model. In some embodiments, the output sequence may be predicted according to method 600, in which an encoder stage of the neural network model generates an encoded representation based on the training input sequence and a decoder stage of the neural network model predicts the output sequence based on the encoded representation. In some embodiments, the decoder stage may predict the output sequence iteratively, e.g., one item at a time.

At a process 720, a learning objective is evaluated based on the output sequence. In some embodiments, the learning objective may correspond to learning objective 520. In some embodiments, the learning objective may be evaluated by comparing the output sequence to a ground truth sequence corresponding to the training input sequence. When the decoder stage predicts the output sequence iteratively, the learning objective may be evaluated at each decoder step by comparing a currently predicted item in the output sequence to a corresponding item of the ground truth sequence.

At a process 730, the parameters of the neural network model are updated based on the learning objective. In some embodiments, the model parameters may be updated using an optimizer, such as optimizer 530. In some embodiments, the parameters may be updated by determining gradients of the learning objective with respect to each of the model parameters and updating the parameters based on the gradients. For example, the gradients may be determined by back propagation. As discussed previously, one or more of the model parameters may be interdependent and/or subject to one or more constraints. Accordingly, the various interdependencies and/or constraints may be enforced when updating the model parameters, e.g., by projecting the model parameters onto a constraint set.

In some embodiments, various model parameters may be isolated at various stages of training. For example, some model parameters may be held fixed while others are trained, the learning rate of some model parameters may be higher or lower than others, and/or the like. In illustrative embodiments, the learned scaling parameters of the interdependent scaling nodes (e.g., scaling nodes 362a-m, 364a-m, 373a-m, and/or 375a-m) may be trained at a higher learning rate than other model parameters during a warm-up stage of training, and may be held fixed (and/or trained at a lower learning rate than other model parameters) during a wind-down stage of training.

Figure 8A:
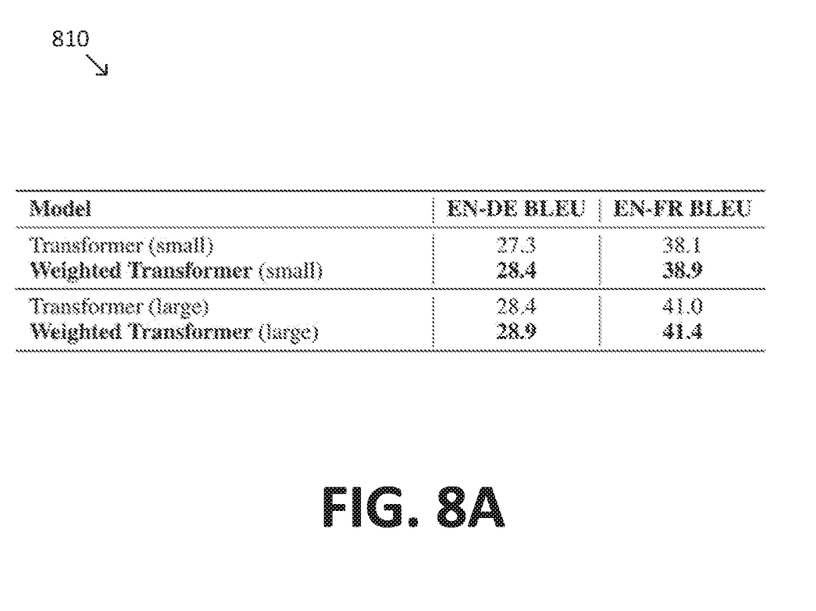
FIGS. 8A-8B are simplified diagrams of an experimental evaluation of a branched transformer model according to some embodiments.
Figure 8B:
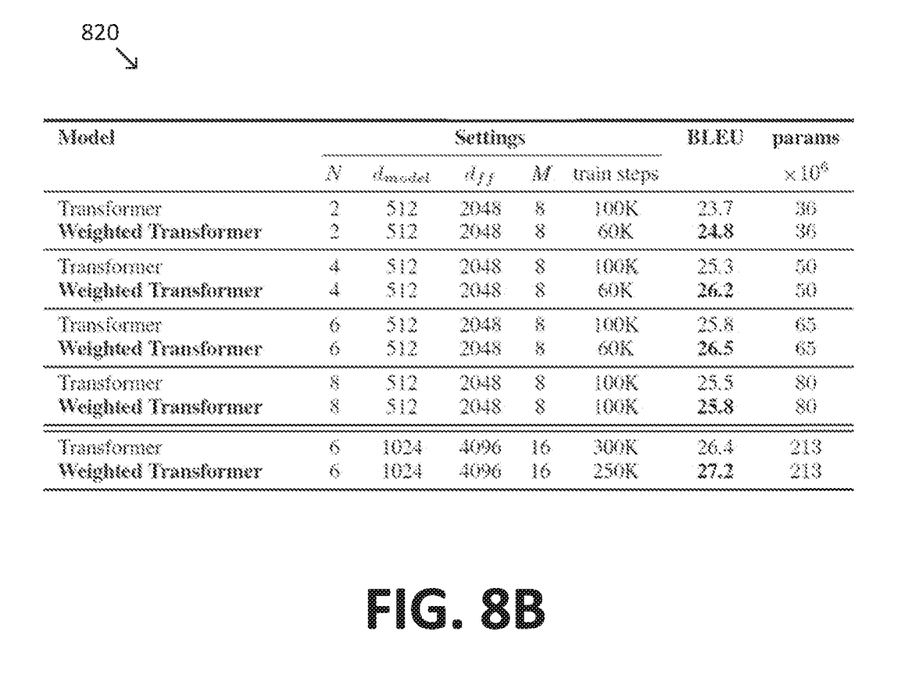

FIGS. 8A-8B are simplified diagrams of an experimental evaluation of a branched transformer model according to some embodiments. The branched transformer model under evaluation generally corresponds to branched transformer model 300, configured as depicted in FIG. 3. The branched transformer model is trained on the WMT 2014 English-to-German data set and the WMT 2014 English-to-French data set, with a training configuration as depicted in FIG. 5.

For each data set, multiple variants of the branched transformer model were evaluated, with each variant having different settings. Examples of settings include: the number of branched attention layers 320a-n and/or 330a-n (N); number of branches 360a-m and/or 370a-m per branched attention layer (M); the number of dimensions of the input representation 315 ($d_{model}$); and the number of hidden nodes in the parameterized transformation network 363f and/or 374f, where the parameterized transformation network 363f and/or 374f includes a two-layer feed-forward neural network ($d_{ff}$). The total number of model parameters (e.g., weights, biases, learned scaling parameters, etc.) of each variant is determined based on the settings. For example, a "base" variant of the model has 65 million model parameters, and a "large" variant has 213 million model parameters.

FIG. 8A depicts a table 810 that compares the BLEU score accuracy of the branched transformer model (i.e., branched transformer model 300, as depicted in FIGS. 3A-3C) to a baseline transformer model (i.e., a transformer model as described in Vaswani). The training and testing is performed on the WMT 2014 English-to-German data set (denoted "EN-DE BLEU") and the WMT 2014 English-to-French data set (denoted "EN-FR BLEU"). As indicated in table 810, the base (or "small") variant of the branched transformer model achieves a BLEU score of 28.4 on the WMT 2014 English-to-German data set, which is an improvement of 1.1 BLEU points over an equivalently sized baseline transformer model. Similarly, the base variant of the branched transformer model achieves a BLEU score of 38.9 on the WMT 2014 English-to-French data set, which is an improvement of 0.8 BLEU points over an equivalently sized baseline transformer model. Moreover, the large variant the branched transformer model achieves a BLEU score of 28.9 on the WMT 2014 English-to-German data set, which is an improvement of 0.5 BLEU points over an equivalently sized state of art transformer model. In addition, the large variant the branched transformer model achieves a BLEU score of 41.4 on the WMT 2014 English-to-French data set, which is an improvement of 0.4 BLEU points over an equivalently sized state of art transformer model.

FIG. 8B depicts a table 820 that compares the BLEU score accuracy of the branched transformer model to the baseline transformer model for a range of model settings, as discussed above. The number of train steps indicates the number of training steps taken for a given model to converge. As indicated, the branched transformer model converged as fast or faster (i.e., using fewer training steps) than the baseline transformer model for all model settings. Moreover, the branched transformer model achieved a higher BLEU score than the baseline transformer model for all model settings. The last column of the table indicates the number of model parameters for each set of model settings.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method for sequence-to-sequence prediction using a neural network model comprising an encoder and a decoder, wherein the encoder comprises a set of branched attention encoder layers arranged sequentially and the decoder comprises a set of branched attention decoder layers, the method comprising:

for each branched attention encoder layer of the set of branched attention encoder layers:

generating, by the respective branched attention encoder layer, a respective layer encoded representation for a corresponding branched attention decoder layer of the decoder based on an input of an input sequence, wherein the respective branched attention encoder layer includes a plurality of branches arranged in parallel, and for each branch of the plurality of branches, the branch includes a respective attention sublayer and a respective scaling sublayer, wherein the generating includes:

determining, at the respective attention sublayer of a respective branch, a respective learned scaling parameter depending on one or more other learned scaling parameters from one or more other branches; and applying, at the respective scaling sublayer of the respective branch, a respective attention to the input of the input sequence in parallel to other branches, based on scaling a respective intermediate representation of the respective branch by the respective learned scaling parameter; and predicting, by the decoder, an output sequence based on a set of respective layer encoded representations sequentially received from the set of branched attention encoder layers, wherein the neural network model includes a plurality of model parameters learned according to a machine learning process.

2. The method of claim 1, wherein the at least one of the encoder or the decoder includes one or more additional branched attention layers are arranged sequentially with the branched attention layer.

3. The method of claim 1, wherein the branched attention encoder layer further includes an aggregation node configured to aggregate a plurality of branch output representations corresponding to each branch of the branched attention encoder layer.

4. The method of claim 3, wherein the aggregation node is configured to aggregate the plurality of branch output representations by summation.

5. The method of claim 1, wherein the respective learned scaling parameter and the one or more other learned scaling parameters are subject to at least one joint constraint.

6. The method of claim 1, wherein the respective learned scaling parameter and the one or more other learned scaling parameters are values between zero and one and add up to one.

7. The method of claim 1, wherein each branch of the branched attention encoder layer further includes a second interdependent scaling node configured to scale a second intermediate representation of the respective branch by a second respective learned scaling parameter.

8. The method of claim 7, wherein each branch of the branched attention encoder layer further includes a parameterized attention network and a parameterized transformation network, and wherein the intermediate representation corresponds to an output representation of the parameterized attention network and the second intermediate representation corresponds to an output representation of the parameterized transformation network, and wherein the parameterized transformation network receives a scaled representation generated by the interdependent scaling node.

9. The method of claim 1, wherein the machine learning process includes projecting the plurality of model parameters onto a constraint set at each training step of the machine learning process.

10. The method of claim 1, wherein the machine learning process includes training the respective learned scaling parameter and the one or more other learned scaling parameters at a higher learning rate than other model parameters among the plurality of model parameters during a warm-up stage of the machine learning process.

11. The method of claim 1, wherein the machine learning process includes fixing the respective learned scaling parameter and the one or more other learned scaling parameters during a wind-down stage of the machine learning process.

12. A system for sequence-to-sequence prediction comprising:

a memory storing a plurality of processor-executable instructions; and a processor reading and executing the processor-executable instructions from the memory to perform operations comprising:

an encoder stage that generates, by an encoder, an encoded representation based on an input sequence, wherein the encoder includes a set of branched attention layers arranged sequentially, each branched attention layer includes a plurality of branches arranged in parallel, and each branch includes a respective attention sublayer and a respective scaling sublayer, wherein the generating includes generating, at each branched attention encoder layer of the set of branched attention encoder layers, a respective layer encoded representation for a corresponding branched attention decoder layer in a decoder by:

determining, at the respective attention sublayer of a respective branch, a respective learned scaling parameter depending on one or more other learned scaling parameters from one or more other branches;

applying, at the respective scaling sublayer of the respective branch, a respective attention to the input sequence in parallel to other branches, based on scaling a respective intermediate representation of the respective branch by the respective learned scaling parameter;

an aggregation node that aggregates a plurality of branch output representations generated by each of the plurality of branches to generate the respective layer encoded representation; and a decoder stage that predicts, by a decoder comprising a set of branched attention decoder layers, an output sequence based on a set of respective layer encoded representations sequentially received from the set of branched attention encoder layers.

13. The system of claim 12, wherein the input sequence corresponds to a first text sequence in a first language and the output sequence corresponds to a second text sequence in a second language.

14. The system of claim 12, wherein each branch among the plurality of branches further includes a parameterized attention network, the parameterized attention network evaluating a scaled dot-product attention based on a layer input representation.

15. The system of claim 14, wherein each branch among the plurality of branches further includes a parameterized transformation network, the parameterized transformation network including a feed-forward neural network.

16. The system of claim 12, wherein the decoder stage predicts the output sequence iteratively.

17. The system of claim 12, wherein the respective learned scaling parameter and the one or more other learned scaling parameters are values between zero and one and add up to one.

18. A non-transitory machine-readable medium having stored thereon a machine translation model, the machine translation model comprising:
- an encoder stage that generates, by an encoder, an encoded representation based on an input sequence, wherein the encoder stage includes a set of branched attention encoder layers arranged sequentially, each branched attention encoder layer includes a plurality of branches arranged in parallel, and each branch includes a respective attention sublayer and a respective scaling sublayer, wherein the generating includes generating, at each branched attention encoder layer of the set of branched attention encoder layers, a respective layer encoded representation for a corresponding branched attention decoder layer in a decoder by:
  - determining, at the respective attention sublayer of a respective branch, a respective learned scaling parameter depending on one or more other learned scaling parameters from one or more other branches;
  - applying, at the respective scaling sublayer of the respective branch, a respective attention to the input sequence in parallel to other branches, based on scaling a respective intermediate representation of the respective branch by the respective learned scaling parameter; and
- an aggregation node that aggregates a plurality of branch output representations generated by the plurality of branches to generate the respective layer encoded representation; and
- a decoder stage that predicts, by a decoder comprising a set of branched attention decoder layers, an output sequence based on a set of respective layer encoded representations sequentially received from the set of branched attention encoder layers.

19. The non-transitory machine-readable medium of claim 18, wherein each branch further includes a respective transformation sublayer and a second respective scaling sublayer, wherein the respective scaling sublayer is between the respective attention sublayer and the respective transformation sublayer, and the second respective scaling sublayer is between the respective transformation sublayer and the aggregation node.

20. The non-transitory machine-readable medium of claim 18, wherein the decoder stage includes one or more branched attention decoder layers, each branched attention decoder layer receiving the respective layer encoded representation generated by a corresponding branched attention encoder layer of the set of branched attention encoder layers.

* * * * *